(No Model.)

A. R. WELCH.
LIQUID GAGE.

No. 517,710.  Patented Apr. 3, 1894.

Witnesses:
P. M. Hulbert
M. B. Dogherty

Inventor:
Allie R. Welch
By Thos. S. Sprague & Son,
Atty's.

UNITED STATES PATENT OFFICE.

ALLIE R. WELCH, OF CHELSEA, MICHIGAN, ASSIGNOR OF ONE-HALF TO FRANK P. GLAZIER, OF SAME PLACE.

LIQUID-GAGE.

SPECIFICATION forming part of Letters Patent No. 517,710, dated April 3, 1894.

Application filed July 17, 1893. Serial No. 480,775. (No model.)

*To all whom it may concern:*

Be it known that I, ALLIE R. WELCH, a citizen of the United States, residing at Chelsea, in the county of Washtenaw and State of Michigan, have invented certain new and useful Improvements in Liquid-Gages, of which the following is a specification, reference being had therein to the accompanying drawings.

The invention consists in the peculiar construction of a float, an indicator, and means for actuating the indicator by the float, and further in the peculiar construction, arrangement of the various parts, all as more fully hereinafter described.

Figure 1:
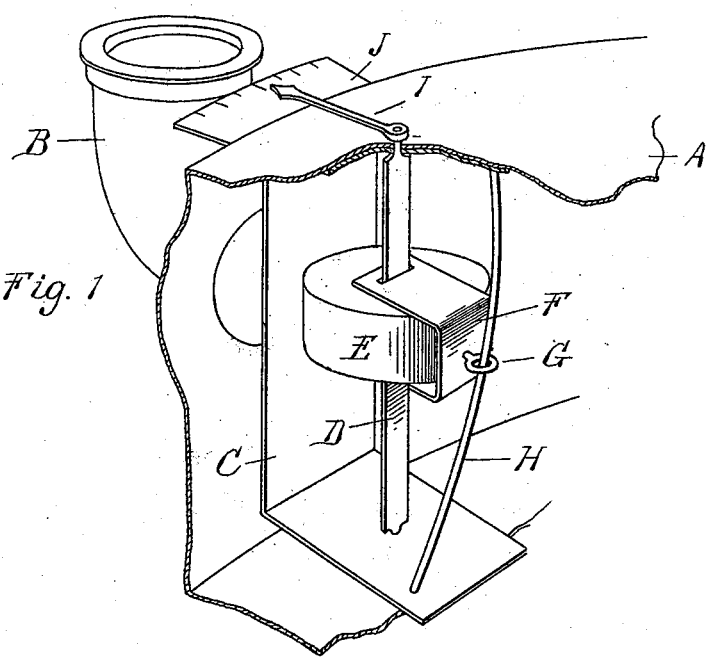
Figure 2:
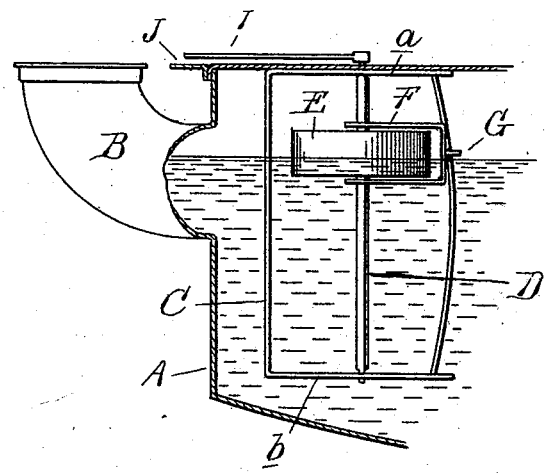

In the drawings, Figure 1 is a perspective view of my device applied to the tank of an oil stove. Fig. 2 is a side elevation thereof, the oil tank being in section.

A is a tank. I have shown a tank such as is usually employed in an oil stove, having a fill nozzle B. My device may however be applied to any other place where the height of liquid is desired to be indicated.

C is a bracket, preferably substantially U-shaped having the two parallel arms *a b* arranged horizontally. This bracket supports the operating parts, and is preferably supported in the tank by securing the arm *a* to the top of the tank, being thus suspended therein. Centrally of the bracket, and journaled in the arms *a b* is a shaft D, upon which slidingly engages the float E, which is apertured to allow it to move freely thereon. The guide portion of the shaft D is angular and straight.

F is the actuating arm of the indicator, it is preferably U-shaped to embrace the float, its arms extending above and below the float, and suitably apertured to freely move with the float up and down the guide portion of the shaft D. At its outer end the arm is provided with an eye G engaging over an inclined guide bar H, secured at opposite ends to the arms *a b* of the bracket. The shaft D projects through the top of the bracket and through the tank and this projection *c*— has secured to it an index I adapted to move over a scale J secured outside the tank. The raising and lowering of the float cause the shaft to rock, by the engagement of the eye G upon the bar H, moving the index across the scale and indicating the height of the fluid in the tank. I preferably arrange the scale and index at the fill opening so that the person filling the tank may see at the same time the height of the liquid.

What I claim as my invention is—

1. In a liquid gage, the combination with a tank, of a frame having an angular extension at its lower end and secured at its upper end to the top of the tank, an inclined guide extending from the outer end of the extension to the top, a vertical shaft journaled in the frame having a straight angular portion, an apertured float on the said angular portion, an arm carried by the float and loosely engaging the inclined guide, and a pointer on the upper end of the shaft, substantially as described.

2. A liquid gage for a tank comprising a bracket, a straight vertical shaft journaled therein, having an angular guide portion, an apertured float moving upon the shaft, an arm having portions above and below the float apertured to embrace the shaft and moving with the float, an eye at the end of the arm, an inclined guide bar supported on the bracket and with which the eye on the arm engages, an extension of the shaft through the bracket and tank, an index on the end of the extension, and a scale, substantially as described.

3. In a liquid gage, the combination with the top of the reservoir, of a bracket secured thereon and consisting of a single metal strip bent at right angles at opposite ends, an inclined guide between the bent ends of the support, a straight angular rock shaft journaled in the bent ends, a pointer on the shaft, a float slidingly secured on the shaft, and an arm extending from the float to the inclined guide and loosely engaging the latter, substantially as described.

In testimony whereof I affix my signature in presence of two witnesses.

ALLIE R. WELCH.

Witnesses:
T. E. WOOD,
GEO. S. GLAZIER.